United States Patent
Kang et al.

(10) Patent No.: US 8,320,429 B2
(45) Date of Patent: Nov. 27, 2012

(54) RECEIVER AND METHOD FOR RECEIVING DATA IN HUMAN BODY COMMUNICATION SYSTEM USING MULTIPLE RECEIVERS

(75) Inventors: Tae Wook Kang, Daejeon (KR); In Gi Lim, Daejeon (KR); Hyung Il Park, Daejeon (KR); Sung Weon Kang, Daejeon (KR); Kyung Soo Kim, Daejeon (KR); Jung Bum Kim, Daejeon (KR); Chang Hee Hyoung, Daejeon (KR); Duck Gun Park, Daejeon (KR); Sung Eun Kim, Seoul (KR); Jung Hwan Hwang, Daejeon (KR); Ki Hyuk Park, Daejeon (KR); Jae Hoon Shim, Daejeon (KR); Jin Kyung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 436 days.

(21) Appl. No.: 12/672,892

(22) PCT Filed: May 27, 2008

(86) PCT No.: PCT/KR2008/002955
§ 371 (c)(1),
(2), (4) Date: Feb. 9, 2010

(87) PCT Pub. No.: WO2009/025440
PCT Pub. Date: Feb. 26, 2009

(65) Prior Publication Data
US 2012/0128036 A1 May 24, 2012

(30) Foreign Application Priority Data
Aug. 20, 2007 (KR) ........................ 10-2007-0083374

(51) Int. Cl.
*H04B 1/00* (2006.01)

(52) U.S. Cl. ........ 375/148; 375/260; 375/262; 375/272; 375/285; 375/343; 375/367

(58) Field of Classification Search ................. 375/144, 375/148, 260, 262, 272, 285, 343, 367; 370/203, 370/208, 209, 320, 335, 342, 441, 479; 455/42, 455/43, 44, 45, 110, 112, 113
See application file for complete search history.

(56) References Cited

U.S. PATENT DOCUMENTS
5,697,083 A 12/1997 Sano
(Continued)

FOREIGN PATENT DOCUMENTS
JP 2006-350517 A 12/2006
(Continued)

OTHER PUBLICATIONS

T.G. Zimmerman, "Personal Area Networks: Near-Field intrabody communication," IBM Systems Journal, 1996, pp. 609-617, vol. 35, Nos. 3 & 4.

(Continued)

*Primary Examiner* — Dhaval Patel

(57) ABSTRACT

There are provided a receiver in human body communication system using multiple receivers reducing an error rate of receiver signals by applying a space diversity acquisition-related SIMO technology to a plurality of received data using multiple receivers or receiver electrodes in a human body communication system using a human body as a medium, and of stably transmitting the data for the interference of signals generated by other users or from different electronic devices, and a method for receiving data in the human body communication system. The receiver and the method for receiving data in a human body communication system may be useful to stably transmit/receive data without any reduction of its transmission rate by reducing the distortion in channels and the signal noise which are caused in the use of one receiver.

14 Claims, 5 Drawing Sheets

U.S. PATENT DOCUMENTS

| | | | |
|---|---|---|---|
| 7,623,922 B2 * | 11/2009 | Bange et al. | 607/32 |
| 8,001,445 B2 * | 8/2011 | Koren et al. | 714/780 |
| 2006/0192724 A1 | 8/2006 | Kezys et al. | |
| 2006/0252371 A1 | 11/2006 | Yanagida | |
| 2008/0009671 A1 | 1/2008 | Kimoto et al. | |
| 2008/0114253 A1 * | 5/2008 | Randall et al. | 600/459 |

FOREIGN PATENT DOCUMENTS

| | | |
|---|---|---|
| JP | 2007-158937 A | 6/2007 |
| JP | 2007-184860 A | 7/2007 |
| WO | WO 2004-066833 A1 | 8/2004 |
| WO | WO 2007-049845 A2 | 5/2007 |
| WO | WO 2007/066979 A1 | 6/2007 |

OTHER PUBLICATIONS

International Search Report for PCT/KR2008/002955 filed on May 27, 2008.

Written Opinion of the International Searching Authority for PCT/KR2008/002955 filed on May 27, 2008.

* cited by examiner

RECEIVER AND METHOD FOR RECEIVING DATA IN HUMAN BODY COMMUNICATION SYSTEM USING MULTIPLE RECEIVERS

TECHNICAL FIELD

The present invention relates to a human body communication system using a human body as a communication channel, and more particularly, to a receiver in human body communication system using multiple receivers capable of reducing an error rate of receiver signals by applying a space diversity acquisition-related SIMO technology to a plurality of received data using multiple receivers or receiver electrodes in a human body communication system using a human body as a medium, and of stably transmitting the data for the interference of signals generated by other users or from different electronic devices, and a method for receiving data in a human body communication system.

The present invention was supported by IT R&D program of MIC//IITA[2006-S-072-02, Controller SoC for Human Body Communication].

BACKGROUND ART

Human body communication refers to a technology of transmitting signals between electronic devices coupled to a human body having conductivity using the human body as a communication channel. This is a technology where a network is configured so that communications between various portable devices such as a personal digital assistant (PDA), a portable personal computer, a digital camera, an MP3 player and a mobile phone, and communications with fixed devices such as a printer, TV and an entrance control system can be made through simple contact with users. The present invention is related to a method and an apparatus capable of enhancing data reception efficiency and reducing an error rate of receiver signals using multiple receivers in the communication of the devices.

For the human body communication, the interference of signals between users is formed under a condition in which a large number of users are present, and also the interference is formed by signals generated from different electronic devices.

Also, an error rate of receiver signals may be increasingly formed since the use of the human body communication system may adversely affect the flow of signals transmitted by transmission means and the stability and correctness of the receiver signals according to a direction of a signal electrode of a receiver terminal to be degraded.

In connection with the above context, as a technology using multiple receivers for the conventional human body communications, there has been proposed a method including: selecting the optimum pair of receiver electrodes among multiple receiver electrodes that are attached to different spots of the human body and performing image processing on a corresponding value of the optimum pair of the receiver electrodes. However, the method has an advantage to increase a receiver sensitivity in the case of the method of selecting only one pair of receiver electrodes with the highest voltage difference from the multiple receiver electrodes, but it has a problem that it is difficult to deduce the receiver signal from a large number of the receiver signals obtained from the multiple receiver electrodes since only the signals obtained from one pair of the receiver electrodes are selected and used for the image processing.

Therefore, there has been an increasing need for a receiver in the human body communication system capable of reducing an error rate of the receiver signals by decreasing the interference in the human body communications, the interference being generated by a large number of users and electronic devices.

DISCLOSURE OF INVENTION

Technical Problem

The present invention has been made to solve the foregoing problems with the prior art, and therefore an aspect of the present invention is to provide a receiver in a human body communication system using multiple receivers capable of reducing an error rate of receiver signals by applying a space diversity acquisition technology, which uses multiple receiver electrodes, to a frequency-selective spreading code technology in a human body communication system using a restricted frequency bandwidth to reduce the interference between users and the strong interference generated from different devices, and a method for receiving data in a human body communication system.

Technical Solution

According to an aspect of the present invention, there is provided a receiver in a human body communication system using multiple receivers, including N (N is a positive integer) plural reception signal electrodes attached to a plurality of spots of a human body to receive signals transmitted using the human body as a medium; N plural human body communication analog front ends (AFEs) connected respectively to the plural reception signal electrodes to remove noise of the received signals, amplify the signals and transmit the respective signals by compensating for the timing synchronization of the receiver signals with a receiver terminal clock and frequency offset; a frequency-selective demodulator for demodulating the N signals transmitted from the plural human body communication AFEs using a frequency-selective spreading code used in a transmission side thereof; a digital signal space diversity acquisitor for outputting one signal by repeating a re-estimation procedure on all position bits in a frame of the N demodulated signals, the re-estimation procedure including: comparing identical position bits in the frame and selecting a bit value of the position bits, which are present in a large number, as a position bit value; and a data processor for undergoing a data processing procedure of the one outputted signal and transmitting the one processed signal to a higher layer.

In this case, the digital signal space diversity acquisitor may output signals that are demodulated by a Walsh code having the highest frequency component when the re-estimation procedure is impossible to perform.

Also, the digital signal space diversity acquisitor may judge whether the number N of the demodulated signals is an even number or an odd number.

Meanwhile, the digital signal space diversity acquisitor may select a bit value of the N/2+1 or more demodulated signals as a bit value of the certain position bits if the bit value of the N/2+1 or more demodulated signals are identical for the certain position bits when the number N of the demodulated signals is an even number, and select, as a bit value of the certain position bits, a value that is spread and despread by the Walsh code having the highest frequency component out of the data bits of the N signals if the N/2+1 or more demodulated signals does not have an identical bit value in comparing values of the certain position bits of the N signals.

On the other hand, the digital signal space diversity acquisitor may select a bit value of the (N+1)/2 or more demodulated signals as a bit value of the certain position bits if the bit value of the (N+1)/2 or more demodulated signals are identical for the certain position bits when the number N of the demodulated signals is an odd number.

Furthermore, the multiple receiver electrodes may be arranged in various directions so that the receiver signals in the human body are received in various directions.

According to another aspect of the present invention, there is provided a receiver in a human body communication system using multiple receivers, including a diversity selector attached to a plurality of spots of a human body to receive N (N is a positive integer) signals from N plural reception signal electrodes, which receive signals transmitted using the human body as a medium, to select a space diversity method according to predetermined information; an analog signal space diversity acquisitor for outputting one signal by calculating an average of analog-to-digital conversion (ADC) output values to voltage values of the N received signals; a first frequency-selective demodulator for demodulating the one outputted signal using the frequency-selective spreading code used in a transmission side thereof; a second frequency-selective spreading demodulator for demodulating the N signals received from the diversity selector using the frequency-selective spreading code used in a transmission side thereof; a digital signal space diversity acquisitor for outputting one signal by repeating a re-estimation procedure on all position bits in a frame of the N demodulated signals, the re-estimation procedure including: comparing identical position bits in the frame and selecting a bit value of the position bits, which are present in a large number, as a position bit value; and a data processor for receiving a demodulated signal from the first frequency-selective demodulator or receiving one signal outputted from the digital signal space diversity acquisitor to undergo a data processing procedure of the outputted signals and transmit the processed signals to a higher layer.

According to still another aspect of the present invention, there is provided a method for receiving data in a human body communication system using multiple receivers, the method including: receiving N (N is a positive integer) signals from N reception signal electrodes attached to a plurality of spots of a human body, the N signals being transmitted using the human body as a medium (Operation 1) and transmitting the N signals; removing noises of the respective N transmitted receiver signals and amplifying the signals (Operation 2); transmitting the respective signals by compensating for the timing synchronization of the N amplified receiver signals with receiver terminal clocks and the frequency offset (Operation 3); demodulating the N signals using the frequency-selective spreading code used in a transmission side of a frequency-selective demodulator (Operation 4); selecting a bit value of the position bits, which are identical and present in a large number, as a position bit value by comparing the same position bits in a frame of the N demodulated signals and performing a re-estimation procedure on the bit value of the position bits (Operation 5); outputting one signal by performing a re-estimation procedure on all position bits in the frame of the N signals (Operation 6); and undergoing a data processing procedure of the outputted signals and transmitting the processed signals to a higher layer (Operation 7).

In this case, the operation 5 may include: judging whether the number of the N signals is an even number or an odd number; selecting a bit value of the N/2+1 or more demodulated signals as a bit value of the certain position bits if the bit value of the N/2+1 or more demodulated signals are identical for the certain position bits when the number N of the demodulated signals is judged to be an even number; and selecting a bit value of the (N+1)/2 or more demodulated signals as a bit value of the certain position bits if the bit value of the (N+1)/2 or more demodulated signals are identical for the certain position bits when the number of the N demodulated signals is judged to be an odd number.

In addition, the operation 5 may include: selecting, as a bit value of the certain position bits, a value spread and despread by the Walsh code having the highest frequency component out of the data bits of the N signals if the value of the certain position bits is not selected.

According to yet another aspect of the present invention, there is provided a method for receiving data in a human body communication system using multiple receivers, the method including: receiving N (N is a positive integer) signals from N plural reception signal electrodes to select a space diversity method according to predetermined information (Operation 1); outputting one signal by calculating an average of analog-to-digital conversion (ADC) output values to voltage values of the N received signals and demodulating the outputted signal when the space diversity is acquired through the processing of analog signals according to the predetermined information (Operation 2); demodulating the N received signals using the frequency-selective spreading code used in a transmission side of a frequency-selective demodulator when the space diversity is acquired through the processing of digital signals according to the predetermined information (Operation 3); outputting one signal by repeating a re-estimation procedure on all position bits of a frame of the N demodulated signals, the re-estimation procedure including: comparing identical position bits in the frame and selecting a bit value of the position bits, which are present in a large number, as a position bit value (Operation 3); and receiving the one signal demodulated in the operation 2 or the one signal outputted in the operation 4, undergoing a data processing procedure of the one received signal and transmitting the one processed signal to a higher layer.

Advantageous Effects

As described above, the receiver and the method for receiving data in a human body communication system using multiple receivers according to the present invention may be useful to stably transmit/receive data without any reduction of its transmission rate by reducing the distortion in channels and the signal noise which are caused in the use of one receiver.

BEST MODE FOR CARRYING OUT THE INVENTION

Figure 1:
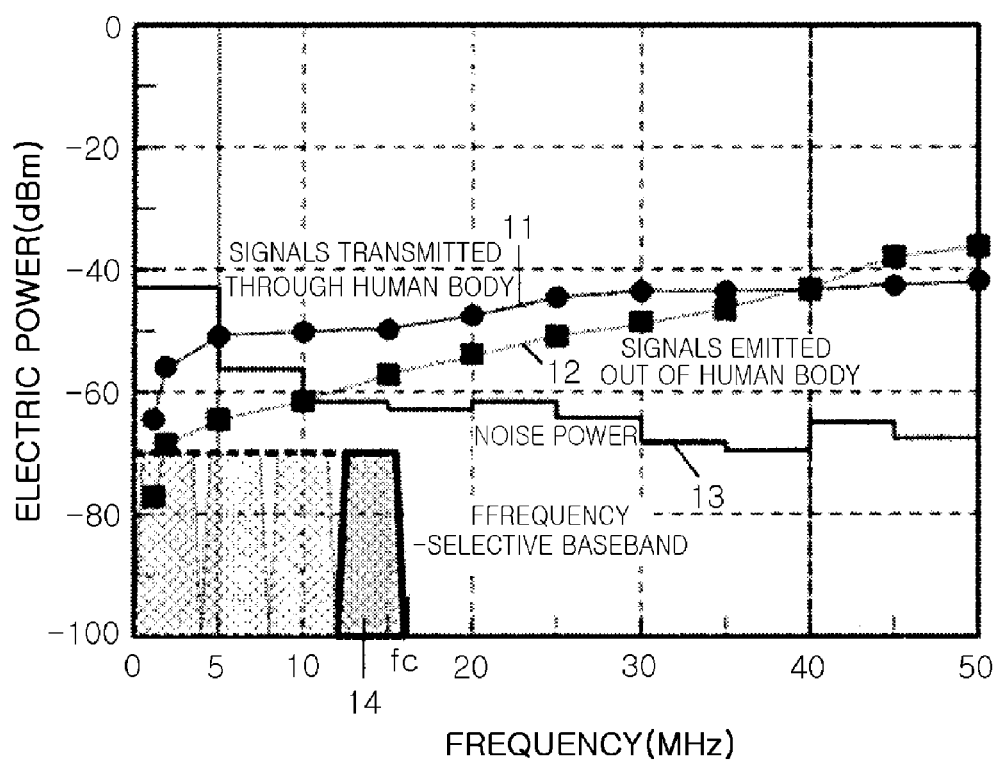
FIG. 1 is a conceptional view illustrating a frequency-selective baseband for a human body communication system in which human body communication systems are performed using multiple receivers according to one exemplary embodiment of the present invention.

Hereinafter, exemplary embodiments of the present invention will now be described in detail with reference to the accompanying drawings, for the purpose of better understanding of the present invention as apparent to those skilled in the art. For the detailed description of the present invention, it is however considered that descriptions of known components and their related configurations according to the exemplary embodiments of the present invention may be omitted since they are judged to make the gist of the present invention unclear.

Also, it is considered that parts that have the similar or substantially identical functions and effects in the accompanying drawings have the same reference numerals.

FIG. 1 is a conceptual view illustrating a frequency-selective baseband for a human body communication system in which human body communication systems are performed using multiple receivers according to one exemplary embodiment of the present invention.

As shown in FIG. 1, when a frequency bandwidth used for human body communication is in a range from DC to 40 MHz, an electric power 11 of a signal (a signal transmitted using a human body as a waveguide) transmitted through a human body is superior to an electric power 12 of a signal (a signal emitted out of a human body using the human body as an antenna) emitted out of the human body, but the electric power 12 emitted out of the human body is higher than the electric power 11 transmitted through the human body when the frequency bandwidth exceeds 40 MHz.

Also, various electromagnetic waves, which are generated in various devices, for example automobiles, fluorescent lamps, mobile phones, computers, TV, radios and the like, that are present in human environments, generates signals in the human body, and the signals generated in the human body function as an interference signal in the communication through the human body.

Interference signals generated in a human body are measured from various measurement spots of the human body, and the resulting measurement results are summed up and averaged by a unit of 5 MHz to obtain a noise power 13 as show in FIG. 1. Referring to a graph of the noise power 13 as show in FIG. 1, it is seen that the highest noise power is generated in a DC to 5 MHz frequency bandwidth.

For the present invention, it will be mainly described that the multiple receivers is used in a human body communication system using a frequency-selective baseband for transmitting data in a restricted frequency bandwidth from 5 to 40 MHz, except for the frequency bandwidth from 0 MHz (DC) to 5 MHz having the highest noise power and the frequency bandwidth over 40 MHz.

The term 'frequency-selective baseband' used in the present invention means a baseband used in a new transmission system that can obtain a desired frequency bandwidth and a processing gain at the same time while performing baseband transmission through which an analog transmitting/receiving block (processor) is made simple by employing only [a spreading code having the most superior frequency characteristic in the frequency bandwidth that a user wants] among all of the spreading codes used for processing gain of data.

For the present invention, the frequency-selective method as shown in FIG. 1 uses 64 Walsh codes as the spreading code. Here, the 64 Walsh codes have a characteristic to distribute the most superior frequencies in order by dividing a 0 to 16 MHz frequency bandwidth into 64 subbands. In this case, the 64 Walsh codes are classified into 4 subgroups, and the frequency-selective baseband transmission in a desired frequency bandwidth may be performed by selecting a Walsh code subgroup using the highest frequency bandwidth 14.

Figure 2:
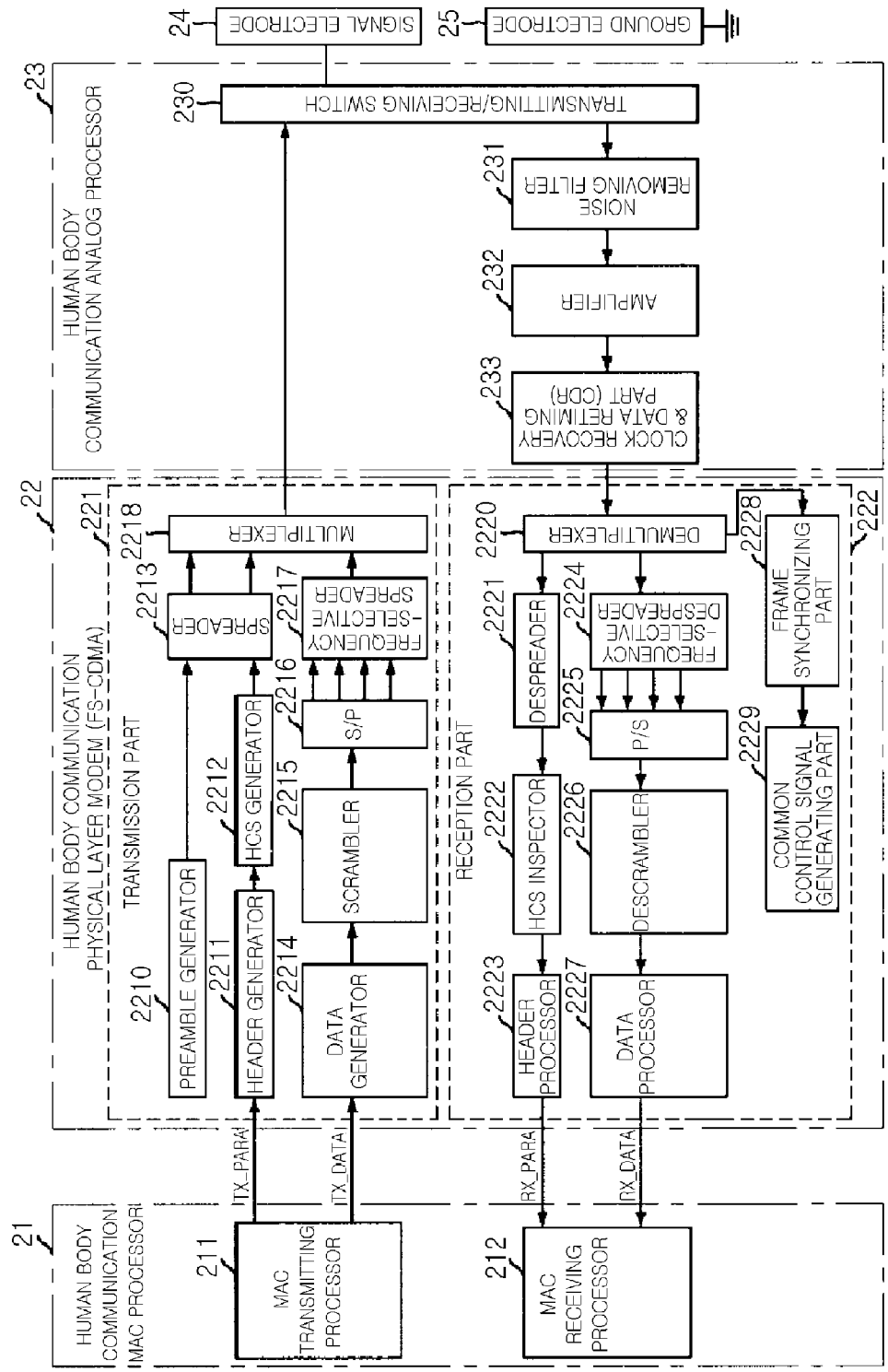
FIG. 2 is a diagram illustrating a human body communication system using a frequency-selective baseband in one receiver electrode according to the present invention.

FIG. 2 is a diagram illustrating a human body communication system using a frequency-selective baseband in one receiver electrode according to the present invention.

The human body communication system (receiver/transmitter) according to the present invention includes a human body communication MAC processor 21, a human body communication physical layer modem (FS-CDMA) 22, a human body communication analog processor 23, a signal electrode 24, and a ground electrode 25.

The human body communication MAC processor 21 is composed of an MAC transmitting processor 211 and an MAC receiving processor 212. Here, the MAC transmitting processor 211 functions to process 'data' and 'data information' (transmission rate, modulation method, user ID, data length, etc.) to be transmitted, which are received from a higher layer, and transmit the processed data and data information to a transmission part 221 in the human body communication physical layer modem 22, and the MAC receiving processor 212 functions to process 'data' and 'data information' received from a reception unit 222 of the human body communication physical layer modem 22, and transmit the processed data and data information to a higher layer.

First, referring to a transmitter in the human body communication system, the transmitter includes an MAC transmitting processor 211 and a transmission part 221 of the human body communication physical layer modem. Particularly, the transmission part 221 in the human body communication physical layer modem 22 includes a preamble generator 2210, a header generator 2211, an HCS generator 2212, a spreader 2213, a data generator 2214, a scrambler 2215, a serial-to-parallel converter (S/P) 2216, a frequency-selective spreader 2217 and a multiplexer 2218, and may use a frequency-selective spreading code to acquire a processing gain and also selectively use only a frequency bandwidth that a user wants by applying a frequency-selective baseband transmission technology or a frequency-selective code division multiple access (FS-CDMA) technology for the human body communication.

The above-mentioned transmission part 221 of the human body communication physical layer modem is mainly composed of preamble/header transmitting processors 2210, 2211, 2212 and 2213, data transmitting processors 2214, 2215, 2216 and 2217, and a multiplexer 2218. Here, the 'preamble/header transmitting processor' functions to spread information on a preamble for frame-synchronization and a header, and may include a preamble generator 2210, a header generator 2211, an HCS generator 2212 and a spreader 2213. The 'data transmitting processor' functions to spread data, which will be transmitted through the human body communication system, into a spreading code (a frequency-selective spreading code) having the most superior frequency characteristic in the frequency bandwidth that a user wants, and may include a data generator 2214, a scrambler 2215, a serial-to-parallel converter (S/P) 2216 and a frequency-selective spreader 2217. And, the multiplexer 2218 functions to multiplex the preamble and header spread from the preamble/header transmitting processor, and the data spread in a frequency-selective manner from the data transmitting processor, and transmit the multiplexed preamble, header and data in the form of a digital signal.

Hereinafter, respective components of the transmission part 221 will be described in detail, as follows.

The preamble generator 2210 is set into a reset value that all users know to generate a preamble having a predetermined length.

The header generator 2211 receives data information (transmission rate, modulation method, user ID, data length)

transmitted from the MAC transmitting processor 211, constructs the received data information into a predetermined header format and outputs the data information, and the HCS generator 2212 receives the outputted data information to generate a header check sequence (HCS).

The spreader 2213 spreads each of the preamble generated in the preamble generator 2210 and the header check sequence (HCS) generated in the HCS generator 2212 into a predetermined spreading code. Particularly, one spreading code out of the frequency-selective spreading codes (spreading codes in the subgroup 3 as shown in FIG. 3d) used in the frequency-selective spreader 2217 is used in the present invention.

Meanwhile, the data generator 2214 receives 'data' transmitted from the MAC transmitting processor 211 and outputs the received data at a desired point of time. The scrambler 2215 is used to maintain security between a host terminal and a certain terminal requiring the security, and generates an orthogonal code using a reset value defined between the two terminals and scrambles the 'data outputted from the data generator 2214' into the generated orthogonal code (that is, scrambles the data by performing an XOR operation on the orthogonal code and the output of the data generator 2214).

The serial-to-parallel converter (S/P) 2216 receives the scrambled data and performs an 4-bit serial/parallel conversion on the received data. The serial/parallel conversion has an effect to reduce a frequency bandwidth to a ¼ bandwidth size, the frequency bandwidth being used in transmitting the data. As a result, the serial/parallel conversion has an effect to transmit a larger quantity of data in the same frequency bandwidth, or to transmit a high-quality data by employing a higher spreading code gain in the same frequency bandwidth.

The frequency-selective spreader 2217 receives outputted 4 bits of the serial-to-parallel converter (S/P) 2216 in parallel and spreads the received 4 bits into the frequency-selective spreading code.

The multiplexer 2218 multiplexes the preamble, the header and the data so that they can be suitable for its frame architecture, and outputs the multiplexed preamble, header and data.

The use of the frequency-selective spreader 2217 makes it possible to perform the baseband transmission in the desired frequency bandwidth and to perform a digital direct transmission by output bits or one bit. Therefore, the multiplexer 2218 transmits the outputted preamble, header and data into the human body through the transmitting/receiving switch 230 and the signal electrode 24 without any of additional 'analog transmitting processors' such as a transmission filter, a digital-analog converter and an intermediate frequency converter. The ground electrode 25 gives a baseline potential as in a ground of the human body communication system (receiver/transmitter).

That is to say, for the present invention, the use of the analog transmission terminals such as the transmission filter, the digital-analog converter and the intermediate frequency converter may be excluded by directly transmitting a frequency bandwidth in a digital manner, the frequency bandwidth being selected through the frequency-selective spreading code.

Next, referring to the receiver in the human body communication system, the receiver includes a human body communication analog processor 23, a reception unit 222 of the human body communication physical layer modem, and an MAC receiving processor 212. Here, the components of the receiver will be described in detail, as follows.

A receiver signal (a digital receiver signal) inputted through the signal electrode 24 is passed through a noise removing filter 231 to remove noises added when the receiver signal is transmitted into a human body through the transmitting/receiving switch 230, and amplified into a signal of a desired size by means of an amplifier 232. The amplified receiver signal is inputted into a clock recovery & data retiming part (CDR) 233 to compensate for the timing synchronization of the receiver signal with a receiver terminal clock and the frequency offset. The outputted receiver signal of the clock recovery & data retiming part (CDR) 233 is inputted into a reception unit 222 of the human body communication physical layer modem 22.

First, when the receiver signal inputted into the reception unit 222 is inputted into a frame synchronizing part 2228 prior to the frame synchronization, the frame synchronizing part 2228 performs a frame synchronization using a preamble of the receiver signal.

When the frame synchronization is achieved by the frame synchronizing part 2228, a common control signal generating part 2229 generates common control signals, for example, a frame boundary signal, a header period signal, a data period signal, a transmission period signal, a reception period signal and the like, which are required in the physical layer transmission part 221 and the reception unit 222. A demultiplexer 2220 in the reception unit 222 divides the receiver signal into a 'header segment' and a 'data segment' and output the segments using the signals generated in the common control signal generating part 2229.

The 'header segment' outputted from the demultiplexer 21 is inputted into a header processor 2223 through a despreader 2221 and an HCS inspector 2222. The header processor 2223 extracts control information of the receiver signal data from the inputted header information and transmits the extracted control information to the MAC receiving processor 212.

Meanwhile, the 'data segment' outputted from the demultiplexer 21 is inputted into a frequency-selective despreader 2224.

The frequency-selective despreader 2224 calculates a correlation value between the inputted data using the frequency-selective spreading codes (16 spreading codes, out of 64 spreading codes, that are used in the transmission part 221 in a frequency-selective manner) used in a transmission side of the frequency-selective despreader 2224, and then outputs 4 bits of data bits as the highest bit value. The outputted 4 bits are inputted into a parallel/serial converter (P/S) 2225, converted in parallel, and inputted into a descrambler 2226.

The descrambler 2226 is an orthogonal code generated using a predetermined reset value between two terminals, and functions to descramble the inputted receiver data. The descrambled receiver data is inputted into a data processor 2227, processed and then transmitted to the MAC receiving processor 212.

Meanwhile, like the transmission part 221, the reception unit 222 of the human body communication physical layer modem also mainly includes a demultiplexer 2220, header receiving processors 2221, 2222 and 2223, and data receiving processors 2224, 2225, 2226 and 2227. Here, the demultiplexer 2220 functions to classify the digital data, transmitted through the human body channels, into a preamble, a header and data. And, the 'header receiving processor' functions to recover original data information by despreading the classified header, and includes a despreader 2221, an HCS inspector 2222 and a header processor 2223. And, the 'data receiving processor' functions to despread the separated data into a spreading code (a frequency-selective spreading code) having the most superior frequency characteristic in the frequency bandwidth that a user wants, and includes a frequency-selective despreader 2224, a parallel/serial converting part (P/S) 2225, a descrambler 2226, and a data processor 2227.

For the human body communication system as shown in FIG. 2, the operation of performing a human body communication using one receiver electrode has been described in detail so as to illustrate the schematic configuration of the human body communication system using multiple receivers. However, it is considered that the human body communication system according to one exemplary embodiment of the present invention may be widely changed and modified for human body communications, and the present invention is characterized in that an error rate of the human body communication system may be reduced using the multiple receivers for the human body communication. Hereinafter, the human body communication system using multiple receivers will be described in detail. However, descriptions of the components as shown in FIG. 2 are omitted for clarity.

Figure 3:
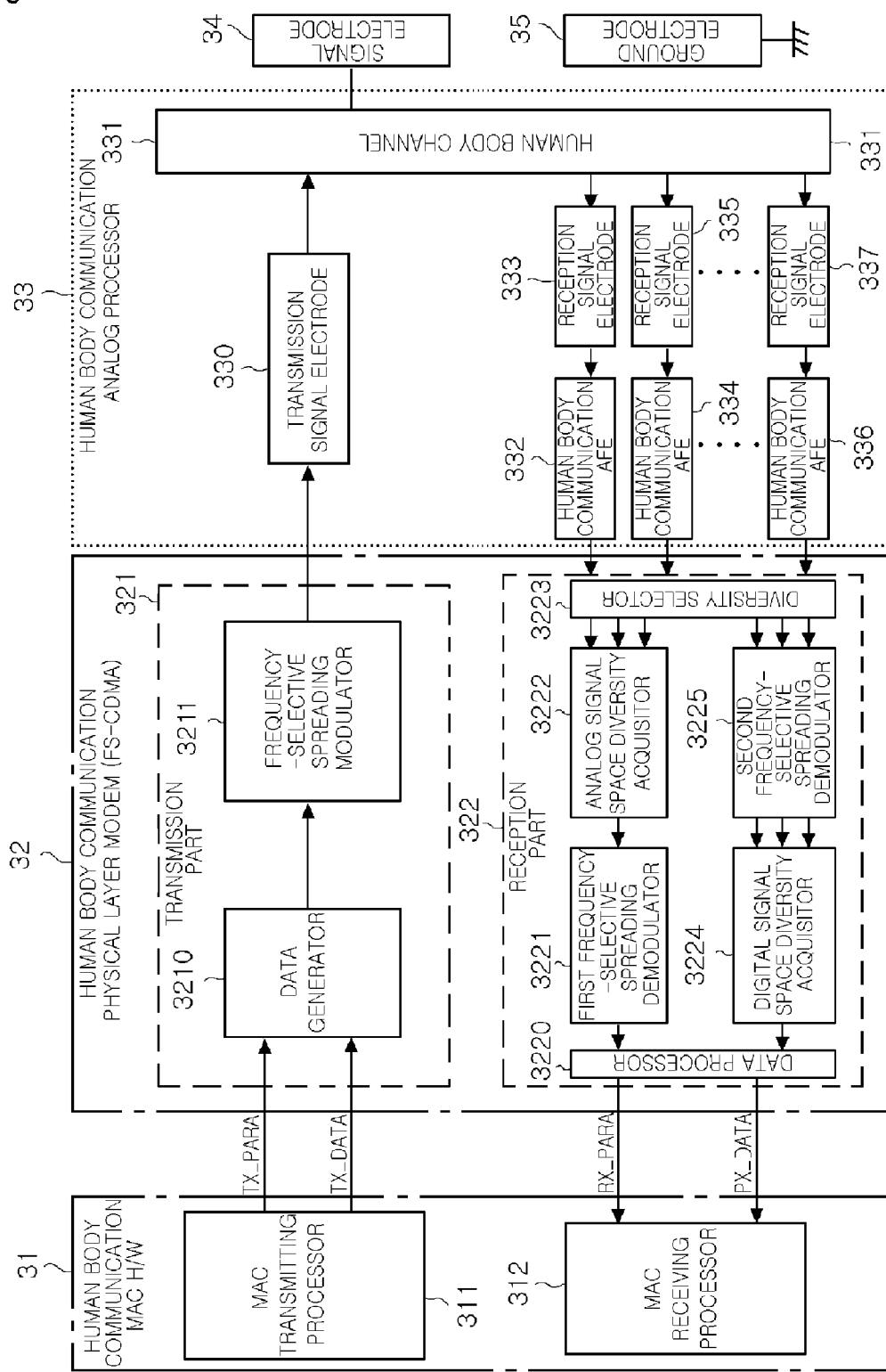
FIG. 3 is a diagram illustrating a configuration of a human body communication system using multiple receivers according to the present invention.

FIG. 3 is a diagram illustrating a configuration of a human body communication system using multiple receivers according to the present invention.

More particularly, FIG. 3 shows one exemplary embodiment of a human body communication receiver/transmitter that is applicable to the present invention. The human body communication receiver/transmitter is composed of a human body communication MAC 31, a human body communication physical layer modem 32 and a transmission signal electrode 330. The human body communication receiver is composed of a plurality of reception signal electrodes 333, 335 and 337, human body communication AFEs 332, 334 and 336 coupled respectively to a plurality of the reception signal electrodes, and a reception unit.

For the present invention, the human body communication receiver includes at least two receiver electrodes 333, 335 and 337 attached to a human body, and human body communication AFEs 332, 334 and 336 corresponding respectively to the receiver electrodes 333, 335 and 337. Therefore, the human body communication receiver may obtain a space diversity gain by applying an SIMO technology to a plurality of the received receiver signals, the SIMO technology including: reducing a transmission error and optimizing a transmission rate by undergoing a predetermined data processing procedure on a plurality of the received receiver signals.

Hereinafter, a schematic configuration of the human body communication system using multiple receivers will be described in detail. However, the same components as shown in FIG. 2 will be described in brief for clarity.

The human body communication MAC 31 is composed of an MAC transmitting processor 311 and an MAC receiving processor 312. The MAC transmitting processor 311 processes data and data information to be transmitted, which are received from a higher layer, and transmit the processed data and data information to a transmission part 321 in the human body communication physical layer modem 32. The MAC receiving processor 312 processes the data and data information received from a reception unit 322 of the human body communication physical layer modem 32, and transmit the processed data and data information to a higher layer.

The transmission part 321 of the human body communication physical layer modem 32 is composed of a data generator 3210 and a frequency-selective spreading demodulator 3211. The data generator 3210 receives data transmitted from the MAC transmitting processor 311 and outputs the received data at a desired point of time. The frequency-selective spreading demodulator 3211 is composed of a preamble generator, a header generator, an HCS generator, a scrambler, spreader, etc. The use of the frequency-selective spreading demodulator 3211 makes it possible to perform the baseband transmission in the desired frequency bandwidth and to perform a digital direct transmission by output bits or one bit. Therefore, the data and data information are inputted into the transmission signal electrode 330 and transmitted into the human body without any of additional analog transmission parts such as a digital-analog converter and an intermediate frequency converter.

The signals transmitted through the transmission signal electrode 330 are transferred through human body channels, and each of the multiple reception signal electrodes 333, 335 and 337 attached to the human body independently receives the signals transferred through the human body channels. The signals received through the multiple reception signal electrodes 333, 335 and 337 contain the same data.

The use of the multiple reception signal electrodes 333, 335 and 337 make it possible to dispose reception signal electrodes, which are attached to the human body, in various electrode directions. Therefore, the quality of the receiver signals may be improved by employing the reception signal electrodes that are suitably arranged to correspond to the various directions in which signals in the human body are received.

Figure 4:
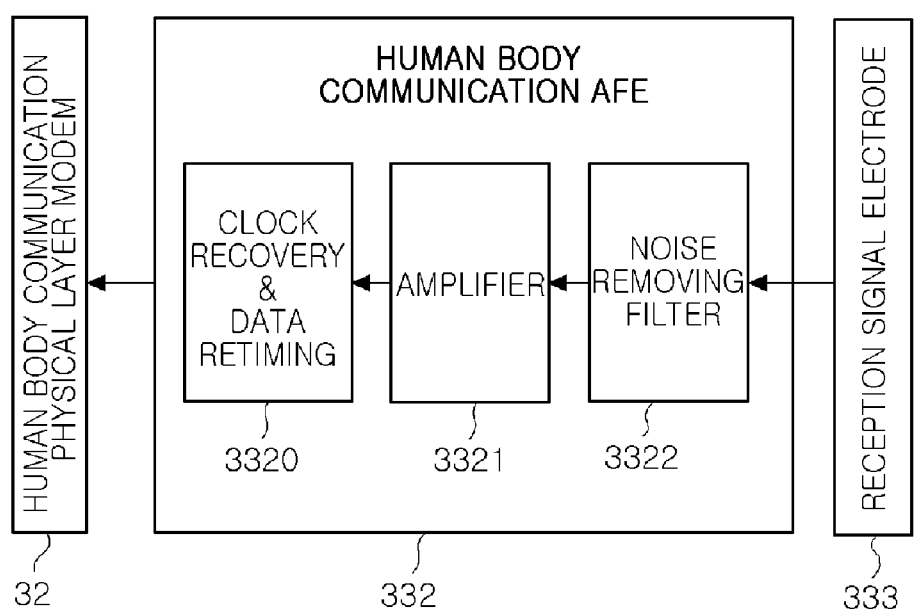
FIG. 4 is a diagram illustrating a configuration of an AFE for human body communication according to the present invention.

The receiver signals received by a plurality of the reception signal electrodes 333, 335 and 337 are transferred to the human body communication AFEs 332, 334 and 336 coupled respectively to the reception signal electrodes 333, 335 and 337. The human body communication AFEs 332, 334 and 336 will be described in detail with reference to FIG. 4.

The human body communication AFEs 332, 334 and 336 includes a noise removing filter 3322, an amplifier 3321 and a clock recovery & data retiming part (CDR) 3320. The noise removing filter 3322 removes noises added when the receiver signal is transmitted from the reception signal electrode to the human body. The noise-free signal is transmitted to an amplifier 3321, and the amplifier 3321 amplifies the noise-free signal into a signal with a desired size. And, the amplified signal is transferred to the CDR 3320 to compensate for the timing synchronization of the receiver signal with a receiver terminal clock and the frequency offset. Each of the human body communication AFEs 332, 334 and 336 transfers the signals of the CDR 3320 to a reception unit 3223 of the human body communication physical layer modem 32.

The reception unit 322 in the human body communication physical layer modem 32, which receives a plurality of N (hereinafter, N is an integer) signals from a plurality of the human body communication AFEs 332, 334 and 336, includes a diversity selector 3223 for selecting a space diversity acquisition method, an analog signal space diversity acquisitor 3222, a first frequency-selective spreading demodulator 3221, a second frequency-selective spreading demodulator 3225, a digital signal space diversity acquisitor 3224 and a data processor 3220.

The diversity selector 3223 receives N signals from N human body communication AFEs 332, 334 and 336 and selects whether to acquire space diversity through an analog signal processing procedure on the signals or a digital signal processing procedure on the signals. Here, the selection by the diversity selector 3223 is performed by the predetermined information.

When the diversity selector 3223 acquires the space diversity through the analog signal processing procedure, the N signals are transferred to the analog signal space diversity acquisitor 3222. The analog space diversity acquisitor 3222 receiving the N signals perform ADC on voltage values of the N signals to calculate an average of the ADC output values, and transfers the average as one signal to the first frequency-selective spreading demodulator 3221. The frequency-selective spreading demodulator 3221 demodulates the signal transmitted using the frequency-selective spreading code used in a transmission side thereof, outputs the demodulated data signal and transmits the data signal to the data processor 3220.

Meanwhile, when the diversity selector 3223 acquires the space diversity through the digital signal processing procedure, the N signals are transferred to the second frequency-selective spreading demodulator 3225. The second frequency-selective spreading demodulator 3225 demodulates each of the N signals using the frequency-selective spreading code used in a transmission side thereof. The N demodulated signals are transferred to the digital signal space diversity acquisitor 3224, and the digital signal space diversity acquisitor 3224 outputs one signal by repeating a re-estimation procedure on all position bits in a frame of the N demodulated signals, the re-estimation procedure including: comparing identical position bits in the frame and selecting a bit value of the position bits, which are present in a large number, as a position bit value. The outputted signal is transferred to the data processor 3220. The data processor 3220 receives the signals transferred to the first frequency-selective spreading demodulator 3221 or the digital signal space diversity acquisitor 3224, undergoes a data processing procedure on the received signals and transmits the processed signals to the MAX receiving processor 312.

The first frequency-selective spreading demodulator 3221 or the second frequency-selective spreading demodulator 3225 in the reception unit 322 of the human body communication physical layer modem 32 demodulates a frequency-selective spreading modulation signal by performing procedures such as frame synchronization using a preamble, despreading, descrambling, HCS inspection and the like, and transmits the modulated signal to the MAC receiving processor. Description of the particular configuration is omitted for clarity since the particular configuration is shown in FIG. 2.

However, the re-estimation procedure for processing a signal, which is used to acquire the space diversity in the digital signal space diversity acquisitor 25, will be described in detail with reference to FIG. 5.

Figure 5:
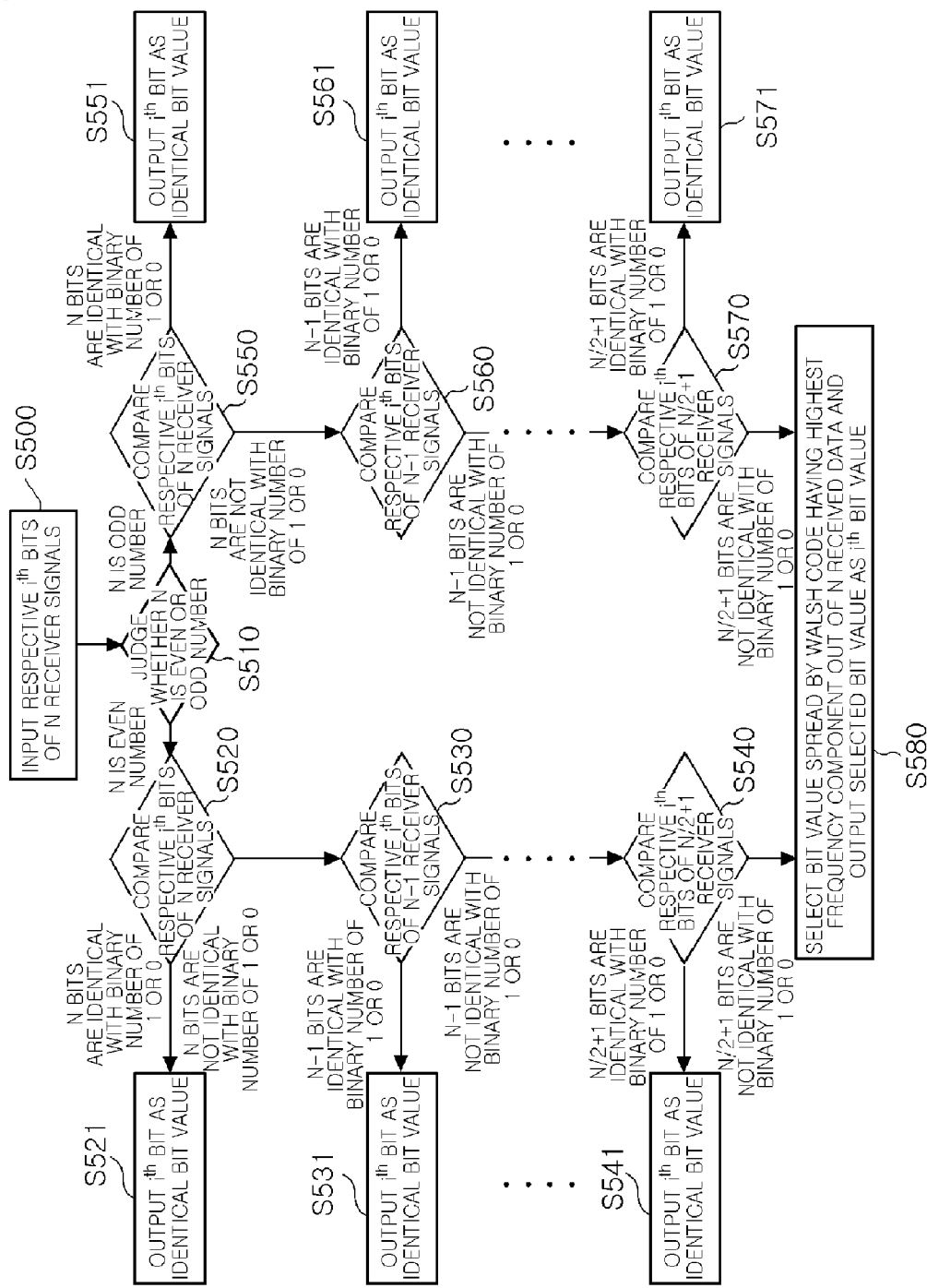
FIG. 5 is a diagram illustrating a re-estimation procedure for acquiring space diversity through the digital signal processing according to the present invention.

FIG. 5 is a diagram illustrating a re-estimation procedure for acquiring space diversity through the digital signal processing according to the present invention.

The re-estimation procedure for processing a signal, which is used to acquire the space diversity in the digital signal space diversity acquisitor 3224, is described, as follows. Assume that N (N=3, 4, 5, ...) data are received, and the received data are named received data 1, received data 2, received data 3, ... received data N. The received data constitutes a data frame mapped to a binary number of 0 and 1. FIG. 5 shows one exemplary embodiment of the flowchart of the operation of acquiring space diversity for identical position bits of the received data frame. Here, an identical position bit represents a position in which the identical position bit is transmitted from the one received data frame, and means an i (i=1, 2, 3 ... M)-numbered bit as show in FIG. 5. Assume that each of the received data is composed of M bits.

First, an i-numbered bit of N receiver signals is inputted (S500). And, it is judged whether the number N of the received data is an even number or an odd number (S510). When the number N of the received data is judged to be an even number, the N received data are compared for the identical position bit i (or, so-called "$i^{th}$ input bit") in the N received data (S520). Then, when the N received data have the same bit value, the bit value is presumed to be a bit value of the identical position bits, and the corresponding bit value in the data frame is inputted as the bit value of the identical position bits into the data processor 3220 (S521). When all the N received data do not have the same bit value, the N identical position bits are compared for the N received data. In this case, when the N−1 received data have the same bit value (S530), the bit value of the N−1 received data is presumed to be a bit value of the identical position bits, and the corresponding bit value in the data frame is inputted as the presumed bit value to the data processor 3220.

The above-mentioned re-estimation procedure is performed until it is judged that the N/2+1 received data have the same bit value (S540). When the N/2+1 identical position bits of the N received data bits do not have the same bit value, a bit value, which is spread and despread by the Walsh code having the highest frequency component in the N received data bits, is selected and inputted into the data processor 3220.

The above-mentioned re-estimation procedure is performed on the M bits. That is to say, estimation values of all bits constituting a data frame are calculated repeating the re-estimation procedure until a position bit i is an $M^{th}$ bit as shown in FIG. 5, and then inputted into the data processor 3220. However, the bit value outputted from the digital signal space diversity acquisitor 3224 may sequentially transfer each of the estimated values of the position bits to the data processor 3220, and also estimate bit values of M position bits in a frame and transfer the entire estimated bit values to the data processor 3220.

When the number of the received data is an odd number, the $i^{th}$ bits of the N receiver signals are compared in the same manner as described above (S550) to judge that the N bits are identical with a binary number of 0 or 1. Also, when all the N receiver signals have the same bit value, the same bit value is estimated to be an $i^{th}$ bit value (S551).

Through the above-mentioned operations S560 and S561, when the (N+1)/2 receiver signals has the same $i^{th}$ bit value, the same $i^{th}$ bit value is estimated to be an $i^{th}$ bit value (S571).

When (N+1)/2 or more receiver signals of the N receiver signals do not have the same $i^{th}$ bit value, a bit value, which is spread and despread by the Walsh code having the highest frequency component in the N received data bits, is selected and outputted as an $i^{th}$ bit value (S580).

While the present invention has been shown and described in connection with the exemplary embodiments, it will be apparent to those skilled in the art that modifications and variations can be made without departing from the spirit and scope of the invention as defined by the appended claims.

The invention claimed is:

1. A receiver in a human body communication system using multiple receivers, comprising:
   N plural reception signal electrodes attached to a plurality of spots of a human body to receive signals transmitted using the human body as a medium;
   N plural human body communication analog front ends (AFEs) connected respectively to the plural reception signal electrodes to remove noise of the received signals, amplify the signals, and transmit N respective signals by compensating for a timing synchronization of the receiver signals with a receiver terminal clock and frequency offset;
   a frequency-selective demodulator for demodulating the N signals transmitted from the plural human body communication AFEs using a frequency-selective spreading code used in a transmission side thereof;
   a digital signal space diversity acquisitor for outputting one signal by repeating a re-estimation procedure on all position bits in a frame of the N demodulated signals, the re-estimation procedure including: comparing identical position bits in the frame and selecting a bit value of the position bits, which are present in a large number, as a position bit value; and a data processor for performing a data processing procedure of the one outputted signal and transmitting the one processed signal to a higher layer, wherein N is a positive integer.

2. The receiver of claim 1, wherein the digital signal space diversity acquisitor outputs signals that are demodulated by a Walsh code having a highest frequency component when the re-estimation procedure is impossible to perform.

3. The receiver of claim 1, wherein the digital signal space diversity acquisitor judges whether the number N of the demodulated signals is an even number or an odd number.

4. The receiver of claim 3, wherein the digital signal space diversity acquisitor selects a bit value of N/2+1 or more demodulated signals as a bit value of certain position bits if the bit value of the N/2+1 or more demodulated signals are identical for the certain position bits when the number N of the demodulated signals is an even number.

5. The receiver of claim 4, wherein the digital signal space diversity acquisitor selects, as a bit value of the certain position bits, a value that is spread and despread by a Walsh code having the highest frequency component out of data bits of the N signals if the N/2+1 or more demodulated signals does not have an identical bit value in comparing values of the certain position bits of the N signals.

6. The receiver of claim 3, wherein the digital signal space diversity acquisitor selects a bit value of (N+1)/2 or more demodulated signals as a bit value of certain position bits if the bit value of the (N+1)/2 or more demodulated signals are identical for the certain position bits when the number N of the demodulated signals is an odd number.

7. The receiver of claim 1, wherein the multiple receiver electrodes are arranged in various directions so that the receiver signals in the human body are received in various directions.

8. A receiver in a human body communication system using multiple receivers, comprising:

a diversity selector attached to a plurality of spots of a human body to receive N signals from N plural reception signal electrodes, which receive signals transmitted using the human body as a medium, to select a space diversity method according to predetermined information;

an analog signal space diversity acquisitor for outputting one signal by calculating an average of analog-to-digital conversion (ADC) output values to voltage values of the N received signals;

a first frequency-selective demodulator for demodulating the one outputted signal using a frequency-selective spreading code used in a transmission side thereof;

a second frequency-selective spreading demodulator for demodulating the N signals received from the diversity selector using the frequency-selective spreading code used in a transmission side thereof;

a digital signal space diversity acquisitor for outputting one signal by repeating a re-estimation procedure on all position bits in a frame of the N demodulated signals, the re-estimation procedure including: comparing identical position bits in the frame and selecting a bit value of the position bits, which are present in a large number, as a position bit value; and a data processor for receiving a demodulated signal from the first frequency-selective demodulator or receiving one signal outputted from the digital signal space diversity acquisitor to perform a data processing procedure of the outputted signals and transmit the processed signals to a higher layer, wherein N is a positive integer.

9. The receiver of claim 8, wherein the diversity selector transmits the N received signals to the analog signal space diversity acquisitor when the space diversity is acquired through processing analog signals according to the predetermined information, and to the second frequency-selective spreading demodulator when the space diversity is acquired through processing digital signals according to the predetermined information.

10. The receiver of claim 8, further comprising N human body communication analog front ends (AFEs) for removing noises of the N signals received from the N reception signal electrodes, amplifying the signals into a signal with a desired size, and transmitting the amplified signals to the diversity selector by compensating for timing synchronization of the receiver signals with receiver terminal clocks and a frequency offset.

11. A method for receiving data in a human body communication system using multiple receivers, the method comprising:

receiving N signals from N reception signal electrodes attached to a plurality of spots of a human body, the N signals being transmitted using the human body as a medium and transmitting the N signals;

removing noises of the respective N transmitted receiver signals and amplifying the signals;

transmitting the respective signals by compensating for timing synchronization of the N amplified receiver signals with receiver terminal clocks and a frequency offset;

demodulating the N signals using a frequency-selective spreading code used in a transmission side of a frequency-selective demodulator;

selecting a bit value of position bits, which are identical and present in a large number, as a position bit value by comparing the same position bits in a frame of the N demodulated signals and performing a re-estimation procedure on the bit value of the position bits;

outputting one signal by performing a re-estimation procedure on all position bits in the frame of the N signals; and performing a data processing procedure of the outputted signals and transmitting the processed signals to a higher layer, wherein N is a positive integer.

12. The method of claim 11, wherein the selecting a bit value of position bits comprises:

judging whether the number of the N signals is an even number or an odd number;

selecting a bit value of N/b 2+1 or more demodulated signals as a bit value of certain position bits if the bit value of the N/2+1 or more demodulated signals are identical for the certain position bits when the number N of the demodulated signals is judged to be an even number; and selecting a bit value of (N+1)/2 or more demodulated signals as a bit value of the certain position bits if the bit value of the (N+1)/2 or more demodulated signals are identical for the certain position bits when the number of the N demodulated signals is judged to be an odd number.

13. The method of claim 12, wherein the selecting a bit value of position bits comprises:
selecting, as a bit value of the certain position bits, a value spread and despread by a Walsh code having a highest frequency component out of data bits of the N signals if the value of the certain position bits is not selected.

14. A method for receiving data in a human body communication system using multiple receivers, the method comprising:
receiving N signals from N plural reception signal electrodes to select a space diversity method according to predetermined information;
outputting one signal by calculating an average of analog-to-digital conversion (ADC) output values to voltage values of the N received signals and demodulating the outputted signal when the space diversity is acquired through processing analog signals according to the predetermined information;
demodulating the N received signals using a frequency-selective spreading code used in a transmission side of a frequency-selective demodulator when the space diversity is acquired through processing digital signals according to the predetermined information;
outputting one signal by repeating a re-estimation procedure on all position bits of a frame of the N demodulated signals, the re-estimation procedure including: comparing identical position bits in the frame and selecting a bit value of the position bits, which are present in a large number, as a position bit value; and
receiving the one demodulated signal or the one signal outputted by repeating the re-estimation procedure on all position bits of the frame of the N demodulated signals, performing a data processing procedure of the one received signal and transmitting the one processed signal to a higher layer
wherein N is a positive integer.

* * * * *